United States Patent [19]

Kwon

[11] Patent Number: 5,308,964

[45] Date of Patent: May 3, 1994

[54] VARIABLE RESOLUTION WAND

[76] Inventor: Young K. Kwon, 27-19, Bokwang-dong, Yongsan-ku, Seoul, Rep. of Korea

[21] Appl. No.: 817,727

[22] Filed: Jan. 7, 1992

[30] Foreign Application Priority Data

Jul. 29, 1991 [KR] Rep. of Korea ............... 1991-13054

[51] Int. Cl.$^5$ ............................................. G06K 7/10
[52] U.S. Cl. .................................. 235/472; 250/227.23
[58] Field of Search .......................... 235/462, 472; 250/221.23

[56] References Cited

U.S. PATENT DOCUMENTS 3,911,270 10/1975 Traub .................................. 235/472
4,705,942 11/1987 Budrikis et al. .................... 235/472

FOREIGN PATENT DOCUMENTS 3400791  7/1985 Fed. Rep. of Germany ...... 235/462
  80472  4/1986 Japan ................................. 235/462
 223990 10/1986 Japan ................................. 235/462

*Primary Examiner*—John Shepperd
*Attorney, Agent, or Firm*—Marshall, O'Toole, Gerstein, Murray & Borun

[57] ABSTRACT

This invention relates to a new type wand which constitute a sensor module at the light receiving portion to increase the optical coupling efficiency, and make the sensor module movable along the wand axis in forward and reverse direction so as to adjust the detecting resolution.

2 Claims, 3 Drawing Sheets

VARIABLE RESOLUTION WAND

BACKGROUND OF THE INVENTION

The present invention relates to a wand which can read optically the value of bar code printed in packing of the goods, more particularly, having structure of variable resolution.

Hithertofore there have been known various types of wands which extract the information that is optically encoded in the bar code symbol and convert it into the character data representation of the symbol's code.

One known type of such wand is of the reflective optical sensor type as shown in FIG. 5 in which a light beam radiated from a light emitting diode (LED) is focused by a lens, and illuminated on the surface of bar code area. After the light reflected back from the surface of bar code area is focused by another lens, the reflected light signal is converted to electrical signal by a detector, such as a photodiode or a phototransister, then the electrical signal is transmitted to an attached decoder, or other processing apparatus.

Another known type is of the receiver lens type as shown in FIG. 6, wherein a light beam radiated from at least one light emitting diode without focusing the light is illuminated on the surface of bar code area, and then the light reflected back from the surface of bar code area is focused only at light receiving portion and sensed by the detector through a slit.

Among other known wands there has been used an optical fiber receiver type as shown in FIG. 7, wherein the light beam radiated from a LED is focused by using a ball lens or any other optical system, and then the light reflected back from the surface of bar code area is sensed at the light receiving portion by using an optical fiber.

However, in the above described conventional wands, the lenses of the light transmitting portion and the light receiving portion are usually fixed, therefore, the light detectabilities and the resolutions of the wands are fixed according to the optical system characteristics.

In the case of the optical fiber receiver type, the resolution and the detection distance are determined by the spot size of the focused light and NA (numerical aperture) value of the optical fiber, so that there is the drawback that the light detectability and the detection distance are fixed. Accordingly, this inherent nature make the resolutions of the wands to be fixed and there are disadvantages that the economical efficiency and the operational efficiency are got worse because the users should prepare various kinds of wands in accordance with the bar code densities.

SUMMARY OF THE INVENTION

The present invention aims at solving the above described disadvantages accompanying the conventional wands, and make it an object to provide a new type wand which constitutes a sensor module at the light receiving portion to increase the optical coupling efficiency, and make the sensor module movable along the wand axis in forward and reverse direction so as to adjust the detecting resolution.

In order to accomplish the above object, the wand according to the present invention is to provide the light focusing portion and the light receiving portion into one sensor module which moves along the wand axis in forward and reverse direction, and to increase the optical coupling efficiency.

First, in the case where the low-brightness LED is used, the multiple optical fiber is used in order to increase the optical coupling efficiency of LED and the optical fiber and the light is focused by a ball lens. According to the above method, although the optical coupling efficiency is increased as number of the optical fiber than conventional efficiency, the focused spot size is not more than the core diameter of the optical fiber, and the light intensity in the spot is increased as number of the optical fiber, sc that the desired detecting characteristic can be obtained at low electrical current.

Also, in the case where the high-brightness LED is used, the optimal characteristic can be obtained by increasing the coupling efficiency of the spherical lens and the ball lens. And since the distance between the ball lens and the front end of the optical fiber can be varied by making use of the optical fiber which has very large NA value (NA value is not less than 0.5), the wand resolution can be adjusted efficiently.

In the case where the optical fiber having small NA value is used, there is a limit to obtain the desired characteristic because the optical coupling efficiency of the light inputted to the light receiving portion is decreased rapidly by changing the above mentioned distance. However, when the NA value of the optical fiber is increased, the optical coupling efficiency is decreased slowly.

In general, there are a number of different printed densities of bar code labels used in the fields, and the optimal use can be expected only when the wands have proper resolutions corresponding to the bar code densities, therefore, the users should prepare various kinds of wands each having different resolutions. However, according to the present invention, it is possible to improve the operational efficiency remarkably by adjusting the wand resolutions in accordance with the bar code densities.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is characterized in the variable structure of the wand resolution by adjusting the distance between ball lens and sensor module, and in the light focusing structure having ball lens and multiple optical fiber.

BRIEF DESCRIPTION OF THE DRAWING

The nature and advantage of the present invention will be understood more clearly from the following description made with reference to the accompanying drawings, in which.

DESCRIPTION OF THE PREFERRED EMBODIMENTS

Figure 1:
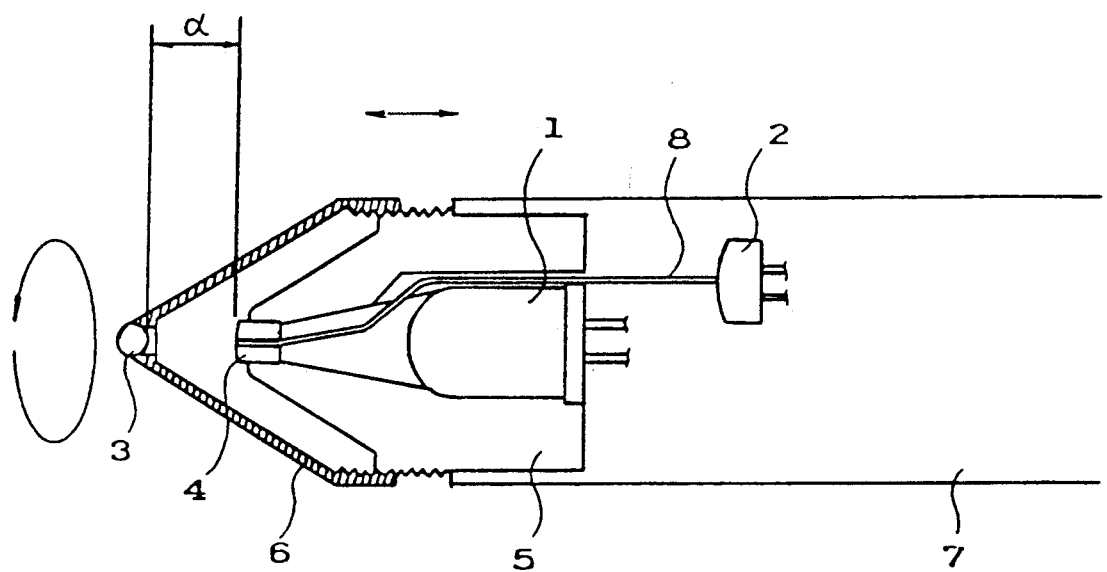
FIG. 1 is a sectional view showing a structure of a first embodiment of the present invention.

The first embodiment of the present invention will be explained in detail with reference to FIG. 1 and 2. Refering FIG. 1, a sensor module comprises a high-brightness LED 1 as light source provided within the rear end of light reflector 5, and a spherical lens 4 inserted in the front end of the light reflector 5. And the optical fiber 8 is inserted between a detector 2, such as a photodiode or a phototransistor, provided outside behind the light reflector 5, and the central opening of the spherical lens 4 inserted to the front end of the light reflector 5, whereby the light reflected from the bar code area is received through a ball lens 3 fixed in a cap 6.

At this time, the cap 6 is movable in forward and reverse direction along the wand axis by rotating so as to vary the distance($a$) between the ball lens 3 and the spherical lens 4 inserted to the front end of the white reflector 5.

Figure 2:
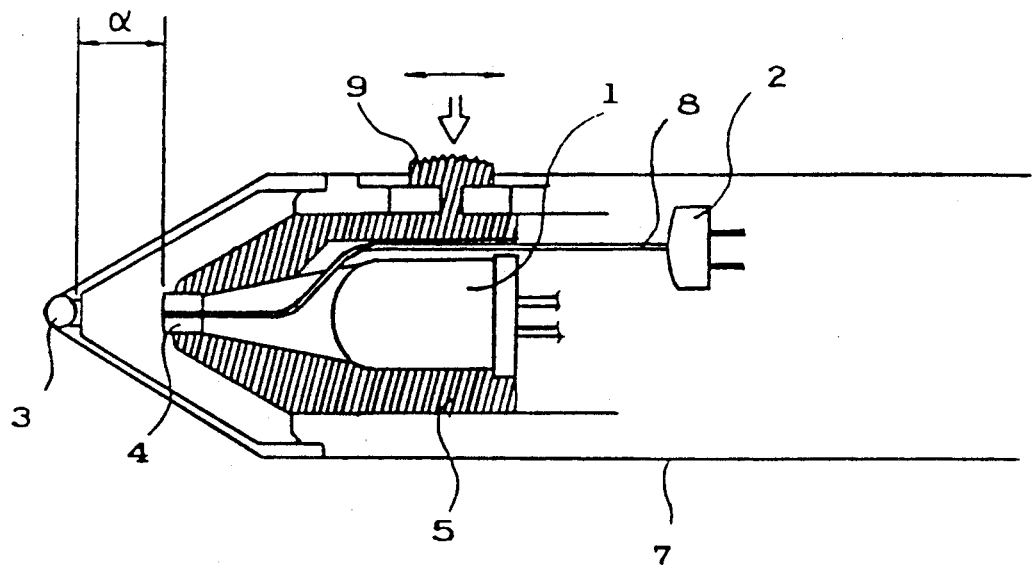
FIG. 2 is a sectional view showing other structure of the first embodiment of the invention.

In addition to the above described cap rotating type-variable structure, as shown in FIG. 2, it may take the sliding type-variable structure that the sensor module is slided inside the wand housing 7.

The light reflected from the bar code area is converted to electrical current in the detector 2, and this electrical current is converted into the character data representation of the symbol's code by the decoder.

Figure 3:
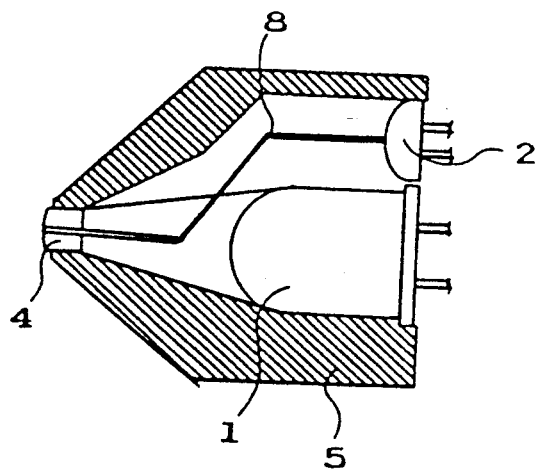
FIG. 3 is a sectional view showing a structure of a second embodiment of the invention.

Now, the second embodiment of the present invention will be explained with reference to FIG. 3. As shown in FIG. 3, the sensor module comprises the high-brightness LED 1 as light source provided within the rear end of the light reflector 5, the detector 2 provided within the rear end of the white reflector 5 in parallel with the high-brightness LED 1, and the spherical lens 4 inserted in the front end of the light reflector 5. The others are identical with the first embodiment, and the relative motion in the wand housing 7 is identical, too.

Figure 4:
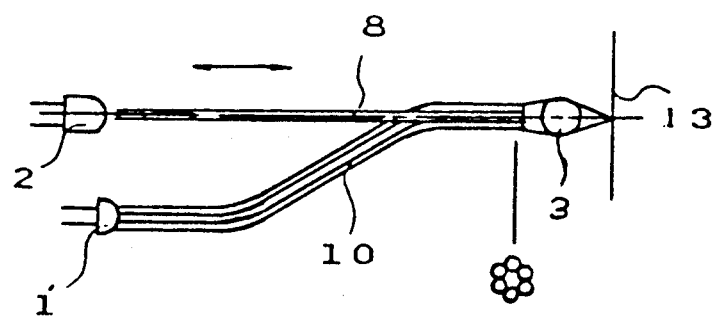
FIG. 4 is a schematic view showing a structure of a portion of a third embodiment of the invention.
Figure 5:
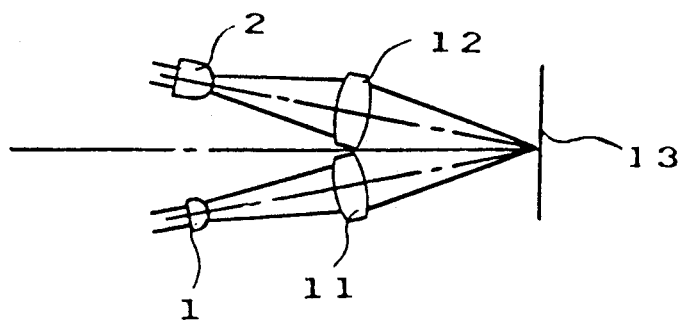
FIG. 5, 6 and 7 are schematic views showing structure of conventional fixed resolution wands.
Figure 6:
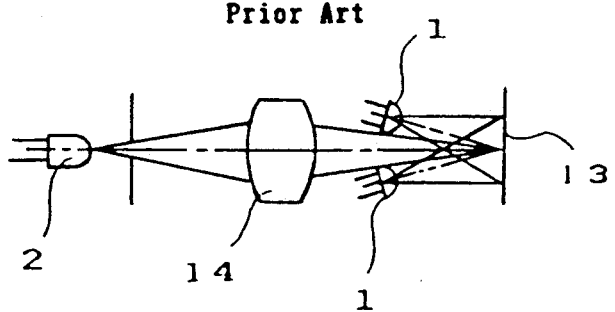
Figure 7:
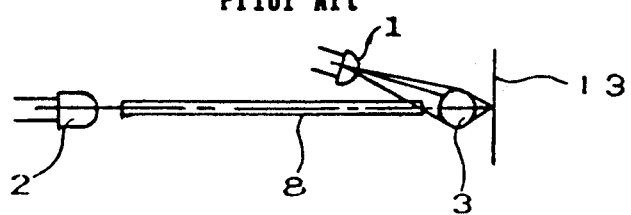

Finally, the third embodiment of the invention will be explained with reference to FIG. 4. In the case where a low-brightness LED is used as light source, as shown in FIG. 4, the light beam radiated from the low-brightness LED 1' is focused by using multiple optical fiber 10 and the ball lens 3 in order to increase the optical coupling efficiency. According to this structure, although the optical coupling efficiency is increased as number of the optical fiber than conventional efficiency, the focused spot size is not more than the core diameter of the optical fiber, and the light intensity in the spot is increased as number of fiber, so that the desired detecting characteristic can be obtained at low electrical current. And also, the distance between the ball lens 3 and the optical fiber 8,10 can be varied by adopting the variable structure as shown in FIGS. 1 and 2, therefore, it is possible to adjust the wand resolution.

According to the structures of the above described embodiments, the wand resolutions can be adjusted in accordance with the bar code densities, therefore, it is not necessary that the users should prepare various kinds of fixed resolution wands as in the past, and also the improvement of the operational efficiency can be expected.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A variable resolution wand having a wand axis, said wand comprising:
   a housing;
   a sensor module including:
      a light reflector having a front end and a rear end;
      a high-brightness LED disposed in said rear end of said light reflector;
      a spherical lens provided in said front end of said light reflector;
      a detector; and
      an optical fiber inserted between said detector and said spherical lens; and
   a cap which is movable in a forward and a reverse direction along said wand axis, said cap having a central opening and including:
      a ball lens provided in said central opening of said cap; and
      means for movably connecting said cap to said housing so that said cap is movable in said forward and reverse directions.

2. A variable resolution wand comprising:
   a housing;
   a sensor module being slidable with respect to said housing, said sensor module including:
      a light reflector having a front end and a rear end;
      a high-brightness LED disposed in said rear end of said light reflector;
      a spherical lens provided in said front end of said light reflector;
      a detector;
      an optical fiber inserted between said detector and said spherical lens; and
      a knob for sliding said sensor module with respect to said housing; and
   a cap fixed to said housing, said cap having a central opening with a ball lens provided in said central opening.

* * * * *